(No Model.)
J. A. METZGER.
HARROW AND CULTIVATOR.
No. 426,837. Patented Apr. 29, 1890.
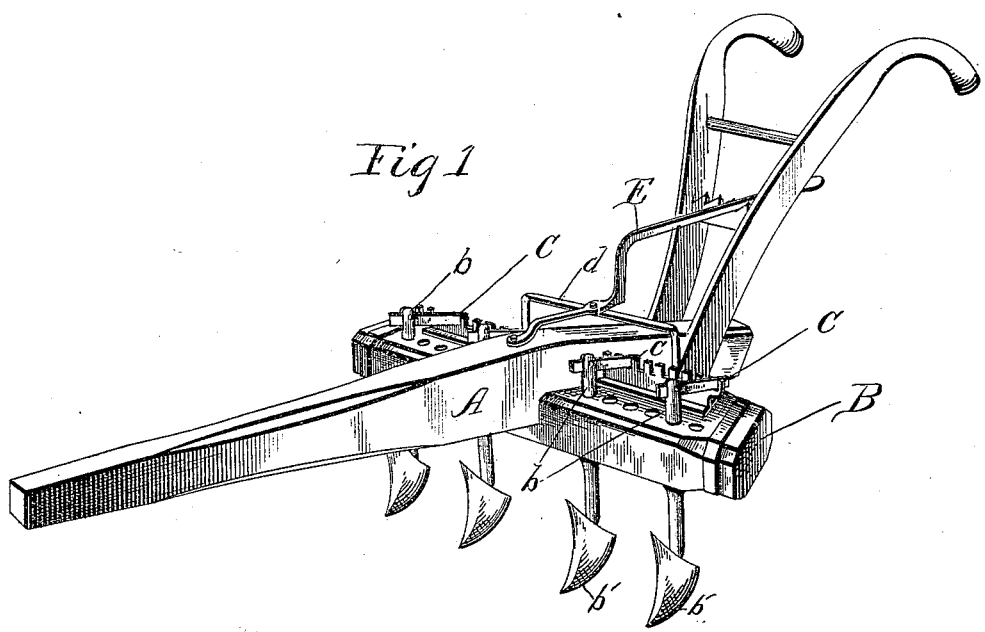
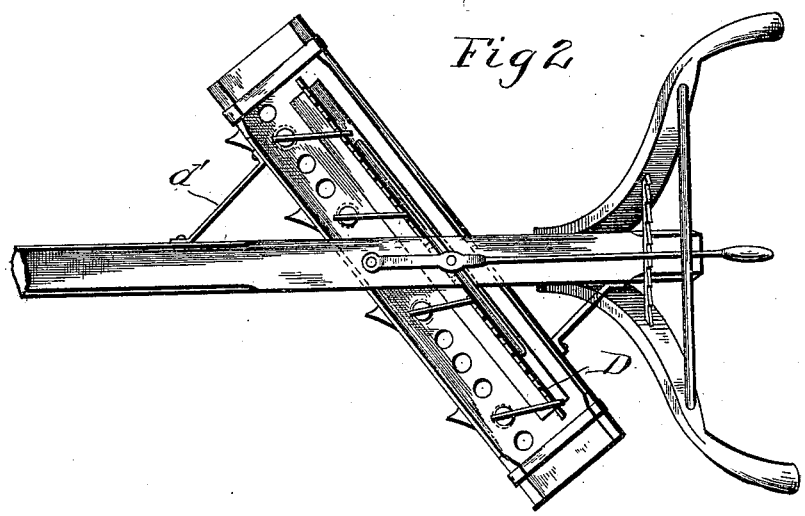

UNITED STATES PATENT OFFICE.

JOHN A. METZGER, OF HAMLET, ARKANSAS.

HARROW AND CULTIVATOR.

SPECIFICATION forming part of Letters Patent No. 426,837, dated April 29, 1890.

Application filed November 13, 1889. Serial No. 330,124. (No model.)

*To all whom it may concern:*

Be it known that I, JOHN A. METZGER, a citizen of the United States, residing at Hamlet, in the county of Faulkner and State of Arkansas, have invented certain new and useful Improvements in a Combined Harrow and Cultivator; and I do hereby declare the following to be a full, clear, and exact description of the invention, which will enable others skilled in the art to which it appertains to make and use the same.

My invention relates to improvements in a cultivator and harrow, the object being to provide a thoroughly-effective implement of this nature, as will be hereinafter described, reference being had to the accompanying drawings, in which similar letters of reference designate corresponding parts in both the views.

Figure 1 is a perspective view, while Fig. 2 is a plan view.

I provide a beam and handles in the usual manner, to the under side of which I attach sub-beam B, which is arranged to cross-beam A at any angle preferred, though I prefer it shall have about the angle shown in Fig. 2. Along the front edge of beam B is arranged a series of holes for receiving the cylindrical shafts $b$ $b$, which are connected to the shovels $b'$ $b'$, as shown.

Pivotally secured to the upper ends of shafts $b$ $b$ are the backward-reaching levers C C, the free ends of which are arranged to drop in any one of the series of ratchets provided in the sliding bar D. The sliding bar D just referred to is secured to the upper side of sub-beam B, so that it will have a sliding or oscillating movement thereon. Attached to each side of the sliding bar D is the loop $d$, which reaches upward above beam A and has attached thereto near its middle the operating-lever E, the front end of which is secured to the beam A, while the rear end extends backward between the handles and engages with the ratchets F, as shown. A brace $d'$ is arranged to extend from the side of beam A to the nearest end of sub-beam B, as shown in Fig. 2.

From the description given it will be observed that a lateral movement given to the lever E will give a corresponding movement to the sliding bar D, and thus turn the handles and shovels attached thereto to any angle preferred, and it will be further seen that said shovels may be moved independently of each other by raising the free end of levers C C, as shown.

Having thus described my invention, what I claim as new, and desire to secure by Letters Patent, is—

1. A combined harrow and cultivator, consisting of beams A and B, the latter provided with a series of holes on its front side for receiving the shafts of the shovels, and further provided on its rear side of its upper surface with the sliding bar D, the elevated center rib of which is provided with a series of ratchets, while said bar is operated by lever E, as shown.

2. In a combined harrow and cultivator, the combination of beams A and B, sliding bar D, lever E, and loop $d$, levers C C, brace $d'$, and ratchet F, all substantially as described, and for the purpose named.

In testimony whereof I affix my signature in presence of two witnesses.

JOHN A. METZGER.

Witnesses:
F. M. PATRICK,
J. J. WARREN.